United States Patent
Borella

(10) Patent No.: US 7,426,188 B2
(45) Date of Patent: Sep. 16, 2008

(54) METHOD AND APPARATUS TO FACILITATE VARIABLE-RATE CALL MANAGEMENT OPERATIONS

(75) Inventor: Michael Borella, Naperville, IL (US)

(73) Assignee: UTStarcom, Inc., Alameda, CA (US)

( * ) Notice: Subject to any disclaimer, the term of this patent is extended or adjusted under 35 U.S.C. 154(b) by 634 days.

(21) Appl. No.: 11/039,012

(22) Filed: Jan. 20, 2005

(65) Prior Publication Data

US 2006/0187940 A1 Aug. 24, 2006

(51) Int. Cl.
- H04J 3/16 (2006.01)
- H04L 12/26 (2006.01)
- H04M 3/22 (2006.01)
- H04M 7/00 (2006.01)

(52) U.S. Cl. ............ 370/252; 370/465; 379/112.05; 379/112.1; 379/221.07; 379/265.01

(58) Field of Classification Search ............ 370/252, 370/465; 379/112.05, 112.1, 221.07, 265.01
See application file for complete search history.

(56) References Cited

U.S. PATENT DOCUMENTS

| | | | | |
|---|---|---|---|---|
| 4,720,850 | A * | 1/1988 | Oberlander et al. | 379/90.01 |
| 6,356,629 | B1 * | 3/2002 | Fourie et al. | 379/112.1 |
| 6,563,918 | B1 * | 5/2003 | Nelson et al. | 379/230 |
| 6,895,088 | B1 * | 5/2005 | Nelson et al. | 379/219 |
| 7,050,555 | B2 * | 5/2006 | Zargham et al. | 379/115.01 |
| 7,161,933 | B2 * | 1/2007 | Stanford | 370/352 |
| 2005/0047423 | A1 * | 3/2005 | Kaul et al. | 370/401 |

OTHER PUBLICATIONS

3rd Generation Partnership Project 2 ("3GPP2"),"cdma2000 Wireless IP Network Standard: Introduction", 3GPP2 X.S0011-001-C Version 1.0, Aug. 2003,25pages.
3rd Generation Partnership Project 2 ("3GPP2"),"cdma2000 Wireless IP Network Standard: Simple IP and Mobile Access Services", 3GPP2 X.S0011-002-C Version 1.0, Aug. 2003, 45 pages.
3rd Generation Partnership Project 2 ("3GPP2"),"cdma2000 Wireless IP Network Standard: Packet Data Mobility and Resource Management", 3GPP2 X.S0011-003-C Version 1.0, Aug. 2003, 30 pages.
3rd Generation Partnership Project 2 ("3GPP2"),"cdma2000 Wireless IP Network Standard: Quality of Service and Header Reduction", 3GPP2 X.S0011-004-C Version 1.0, Aug. 2003, 44 pages.
3rd Generation Partnership Project 2 ("3GPP2"),"cdma2000 Wireless IP Network Standard: Accounting Services and 3GPP2 Radius VSAs", 3GPP2 X.S0011-005-C Version 1.0, Aug. 2003, 48 pages.
3rd Generation Partnership Project 2 ("3GPP2"),"cdma2000 Wireless IP Network Standard: PrePaid Packet Data Service", 3GPP2 X.S0011-006-C Version 1.0, Aug. 2003, 35 pages.

* cited by examiner

Primary Examiner—Alpus H Hsu

(57) ABSTRACT

A network element (20), such as a PDSN or home agent, upon determining (11) a need to effect a call management operation, then determines (12) whether to constrain the facilitation of that call management operation. When determining that the call management operation should be constrained, the network element can facilitate (14) that call management operation while imposing an artificial facilitation constraint. For example, the rate at which the call management operation is executed with respect to a plurality of existing calls can be specified.

20 Claims, 1 Drawing Sheet

METHOD AND APPARATUS TO FACILITATE VARIABLE-RATE CALL MANAGEMENT OPERATIONS

TECHNICAL FIELD

This invention relates generally to communication networks and more particularly to communication networks that can support a relatively large number of simultaneous calls.

BACKGROUND

Various communication networks are known in the art. Many such communication networks employ network elements such as packet data serving nodes and home agents that are each capable of simultaneously supporting a relatively large number of calls (such as thousands or tens of thousands of simultaneous calls). In general, such network elements are ultimately limited with respect to a total number of simultaneous calls that can be handled by such factors as total available computational capacity and memory.

Various call management operations are also known. Some call management operations require using a network element to effect the operation with respect to a relatively large number, or even all, of the calls being handled at a given time by that network element. For example, some remote authentication dial-in user service (RADIUS) accounting updates, disconnect-all-calls commands, and Point-to-Point Protocol (PPP) renegotiations will often require a network element to effect a given operation with respect to each (or many) presently supported calls.

When such a call management operation occurs, the network element may become overwhelmed with respect to its native computational capacity. The per-call processing capacity required to effect the operation over thousands of existing calls can render the network element unable to transfer data on existing calls, establish new calls, and so forth.

BRIEF DESCRIPTION OF THE DRAWINGS

The above needs are at least partially met through provision of the method and apparatus to facilitate variable-rate call management operations described in the following detailed description, particularly when studied in conjunction with the drawings, wherein.

Figure 1:
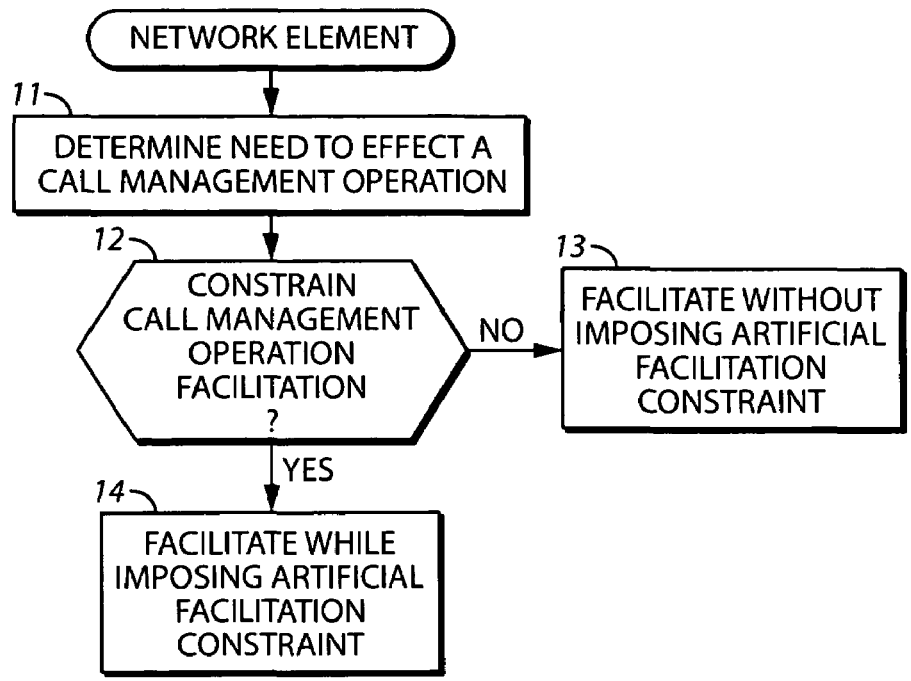
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a network element that simultaneously supports a plurality of communication calls, upon determining a need to effect a call management operation with respect to at least some of the plurality of communication calls can determine whether to constrain the call management operation during facilitation of the call management operation. In some cases, when determining not to constrain the call management operation, the network element can facilitate the call management operation without imposing an artificial facilitation constraint. In other cases, when determining to constrain the call management operation, the network element can facilitate the call management operation while imposing an artificial facilitation constraint.

The artificial facilitation constraint can be varied as appropriate to the application. Pursuant to one approach, the artificial facilitation constraint can comprise a specific rate at which the call management operation is facilitated (such as a specific maximum number of communication calls as are operated upon per a predetermined period of time and/or a specific usage rate of computational capacity. If desired, such a rate can be selected from amongst a plurality of candidate rates. Selection of a given rate can be predetermined (as when a given call management operation is pre-correlated to a specific rate of facilitation) or determined in other ways (for example, by receiving specific input from a user such as a network administrator regarding a specific rate to use at a given time or in conjunction with a specific call management operation).

So configured, a network element can be better assured of being able to maintain an ongoing capability to continue servicing existing calls and to accommodate new calls while also attending to the facilitation of call management operations, even when the latter require a corresponding operation and action with respect to each and every presently supported call. These teachings and benefits are applicable to various network elements including but not limited to packet data serving nodes, home agents, and the like.

These and other benefits may become clearer upon making a thorough review and study of the following detailed description. Referring now to the drawings, and in particular to FIG. 1, these teachings provide for a process 10 to be effected by a network element that simultaneously supports a plurality of communication calls such as a Packet Data Serving Node (PDSN) or a Home Agent (HA) as are otherwise well known in the art.

Pursuant to this process 10, the network element determines whether a need exists to effect a call management operation ill using the network element with respect to at least some of the presently supported plurality of communication calls. Examples of call management operations include, but are not limited to, RADIUS accounting updates (such as time-of day based accounting updates tat may comprise an account stop/start pair per call), disconnect-all-calls commands, and PPP renegotiations as may be occasioned by certain events. Such exemplary operations are well known and understood in the art and therefore additional elaboration will not be provided here for the sake of brevity and preservation of narrative focus.

This determination can be based upon various criteria, which criteria will likely vary with architectural and administrative differences from network to network. Example criteria, however, include but are not limited to basing such a determination upon receiving a specific instruction to effect the call management operation (as may be automatically sourced by an authorized platform and/or sourced by an administrator).

The network element then determines whether to constrain the call management operation 12 during facilitation of the call management operation. This determination, too, can be based upon varying criteria and/or stimuli as will likely vary from network to network as a function of platform variations and administrative preferences. As one relatively straightforward approach, the network element can have access to information that correlates one or more call management operations with a constraint requirement or advisory. In such a case, for example, the network element can determine whether to constrain call management operation facilitation based upon whether the call management operation has been previously characterized as requiring constrained facilitation.

When the network element determines that constraint is not required, the network element can then facilitate the call management operation without imposing an artificial facilitation constraint 13 to thereby effect, for example, present prior art practice and results. Such a result serves well when the call management operation is not otherwise likely to overwhelm the network element with respect to its execution.

When, however, the network element determines that the call management operation shall be constrained, the network element can facilitate the call management operation while imposing an artificial facilitation constraint 14. Those skilled in the art will recognize that execution of all operations of the type referred to herein are constrained in some manner or another due to the natural limitations of the enabling platform and/or dynamic variations due to, for example, other computational needs, peripheral availability, and so forth. Such constraints as these may be viewed as being ordinary and normal notwithstanding their potential dynamic nature. An artificial facilitation constraint, by way of comparison, does not exist in ordinary and normal course. Rather, it is a supplemental imposed calculated limit with respect to execution of the call management operation that applies regardless of whether excess capacity is then otherwise available or not.

Pursuant to one approach, this artificial facilitation constraint can correspond to a rate of facilitating the call management operation. For example, the artificial facilitation constraint can comprise a rate of facilitating the call management operation with respect to a maximum number of communication calls per a predetermined period of time such as, for example, 100 calls per second. This would mean that the call management operation could not be effected at any faster rate than 100 calls for each second of operation execution. Being an artificial constraint, this rate would apply notwithstanding availability of additional presently unused computational resources.

As another example, the artificial facilitation constraint could comprise a rate of facilitating the call management operation with respect of usage of computational capacity. To illustrate, the constraint might limit operation facilitation to use of no more than 25% of the total computational capacity of the network element. Being an artificial constraint, this limit would apply even when additional computational capacity might otherwise be available.

By one approach, the network element can have access to a plurality of candidate rates. So configured, a specific rate from amongst the plurality of candidate rates would be selected for use when constraining the facilitation of a call management operation. Again, a specific rate could be selected in various ways, including by having a given rate pre-associated with a corresponding call management operation or by receiving user input regarding the rate to select.

So configured, the network element will be able to effect a given call management operation while nevertheless avoiding an overload with respect to its processing capabilities. This in turn will contribute to improved user experiences for both existing calls and new calls.

Figure 2:
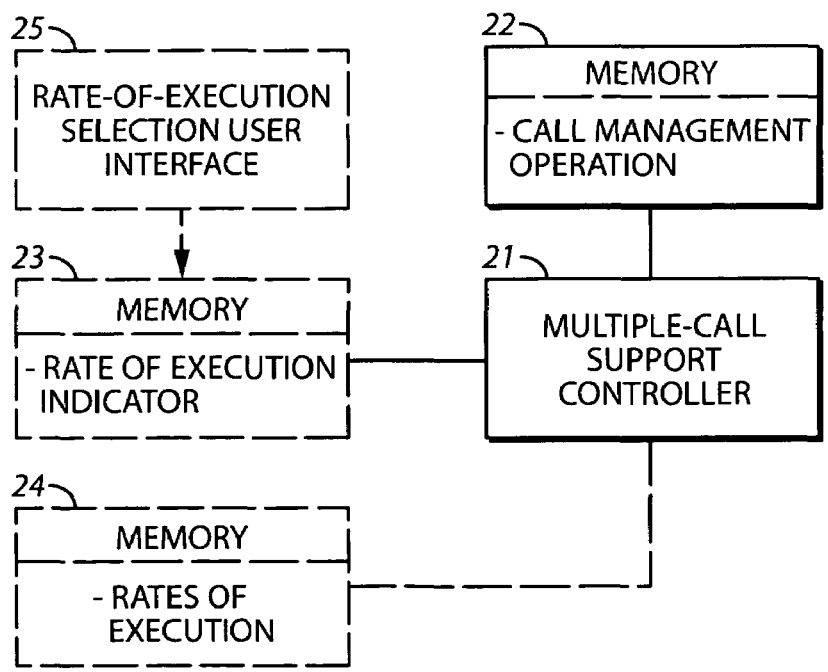
FIG. 2 comprises a block diagram as configured in accordance with various embodiments of the invention.

Such a process can be carried out by various enabling platforms, alone or in combination with one another. With reference now to FIG. 2, an illustrative example of a compliant network element 20 will be provided.

A multi-call support controller 21 serves, in part, to facilitate the various calls that are serviced by the network element 20 (with such servicing being well understood in the art and requiring no further explanation here). In a preferred approach, this multi-call support controller 21 also serves to effect the execution of one or more call management operations at a rate of execution that corresponds to an indicator as described below.

To support such functionality, the multi-call support controller 21 operably couples to a first memory 22 that retains at least one call management operation that is executable by the multi-call support controller 21. This call management operation (or operations) may be stored in the first memory 22 for a long duration of time (thereby permitting repeated use and execution of the operation over that time frame) or for a relatively short period of time (for example, the call management operation may be downloaded at a time of need, executed, and then removed from memory).

As described above, such call management operations are preferably executable at varying rates. With this in mind, the multi-call support controller 21 also operably couples to a second memory 23 having a rate of execution indicator stored therein. In a preferred approach, this rate of execution indicator specifies a rate of execution to use when executing a given call management operation (which rate may be a specific value or may, if desired, comprise a range of values). For example, as explained above, this rate of execution can correspond to a number of communication calls per a unit of time that are processed with respect to the call management operation.

For some applications and settings it may be desirable for the network element 20 to optionally but further comprise a third memory 24 that also operably couples to the multiple-call support controller 21 and which has a plurality of rates of execution stored therein. So configured, the rate of execution indicator provided by the second memory 23 can specify a particular rate of execution as is retained by the third memory 24. The rates of execution themselves may be specific overall rate values or may comprise one or more parameters as can be used by the multiple-call support controller 21 when executing a given call management operation to achieve a particular overall effective rate. Other possibilities also exist with specifics of a given implementation depending greatly upon the many variables that differentiate one network and administrative point of view with another.

As mentioned above, for some purposes it may be desirable to permit an authorized user, such as an administrator, to select a particular rate of execution. This can be done in any number of ways. As but one example, the network element 20 can further comprise an optional rate-of-execution selection user interface 25. This user interface 25 can, for example, operably couple to the second memory 23 and serve to specify and/or store the particular rate of execution indicator to be used by the multiple-call support controller 21.

In the illustrative example provided above, those skilled in the art will recognize that the logical partitioning shown will not necessarily correlate in a similar fashion to specific components and/or architecture. As one example, the various memories shown can be comprised of a single memory or, if desired, can be further parsed and distributed over a larger number of discrete storage platforms. Those skilled in the art will recognize that such variations are well within the scope of these teachings and that the benefits set forth herein can be achieved using a wide variety of physical embodiments.

So configured, a given network element, such as a PDSN or a home agent, can serve, when called upon, to effect a given call management operation while also being better assured that existing and future calls are serviced without delay or degradation.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A method for use with a network element that simultaneously supports a plurality of communication calls comprising:
    determining a need to effect a call management operation using the network element with respect to at least some of the plurality of communication calls;
    determining whether to constrain the call management operation during facilitation of the call management operation;
    when determining to not constrain the call management operation, facilitating the call management operation without imposing an artificial facilitation constraint;
    when determining to constrain the call management operation, facilitating the call management operation while imposing an artificial facilitation constraint.

2. The method of claim 1 wherein the network element comprises a Packet Data Serving Node.

3. The method of claim 1 wherein the network element comprises a Home Agent.

4. The method of claim 1 wherein determining whether to constrain the call management operation during facilitation of the call management operation comprises determining whether the call management operation has been previously characterized as requiring constrained facilitation.

5. The method of claim 1 wherein:
    determining a need to effect a call management operation using the network element with respect to at least some of the plurality of communication calls comprises receiving an instruction to effect the call management operation;
    determining whether to constrain the call management operation during facilitation of the call management operation comprises determining whether the instruction includes information regarding whether to constrain the call management operation.

6. The method of claim 1 wherein facilitating the call management operation while imposing an artificial facilitation constraint comprises imposing an artificial facilitation constraint as corresponds to a rate of facilitating the call management operation.

7. The method of claim 6 wherein imposing an artificial facilitation constraint as corresponds to a rate of facilitating the call management operation further comprises imposing an artificial facilitation constraint as corresponds to a rate of facilitating the call management operation with respect to a maximum number of the communication calls per a predetermined period of time.

8. The method of claim 6 wherein imposing an artificial facilitation constraint as corresponds to a rate of facilitating the call management operation further comprises imposing an artificial facilitation constraint as corresponds to a rate of facilitating the call management operation with respect to usage of computational capacity.

9. The method of claim 6 wherein imposing an artificial facilitation constraint as corresponds to a rate of facilitating the call management operation further comprises selecting the rate from amongst a plurality of candidate rates.

10. The method of claim 9 wherein selecting the rate from amongst a plurality of candidate rates comprises selecting a rate as was preselected to correspond with the call management operation.

11. The method of claim 9 wherein selecting the rate from amongst a plurality of candidate rates comprises receiving user input regarding the rate to select.

12. The method of claim 1 wherein the call management operation comprises at least one of:
    a Remote Authentication Dial-In User Service accounting update;
    a disconnect-all-calls command;
    Point-to-Point Protocol renegotiation.

13. A network element comprising:
    a multiple-call support controller configured and arranged to simultaneously support a plurality of communication calls;
    a first memory operably coupled to the multiple-call support controller and having at least one call management operation stored therein, which at least one call management operation is executable by the multiple-call support controller with respect to the plurality of communication calls and which call management operation is executable at a plurality of rates of execution;
    a second memory operably coupled to the multiple-call support controller and having an indicator stored therein, which indicator specifies a rate of execution to use when executing the call management operation.

14. The network element of claim 13 wherein the network element comprises a Packet Data Serving Node.

15. The network element of claim 13 wherein the network element comprises a Home Agent.

16. The network element of claim 13 wherein the rate of execution corresponds to a number of communication calls per a unit of time.

17. The network element of claim 13 and further comprising:
    a third memory operably coupled to the multiple-call support controller and having a plurality of rates of execution stored therein, wherein the indicator specifies at least one of the plurality of rates of execution.

18. The network element of claim 13 and further comprising:
    a rate-of-execution selection user interface operably coupled to the second memory.

19. The network element of claim 13 wherein the multiple-call support controller comprises means for executing the call management operation at a rate of execution that corresponds to the indicator.

20. The network element of claim 13 wherein the call management operation comprises at least one of:
    a Remote Authentication Dial-In User Service accounting update;
    a disconnect-all-calls command;
    Point-to-Point Protocol renegotiation.

* * * * *